Patented Nov. 26, 1929

1,737,297

UNITED STATES PATENT OFFICE

MAX BUCHNER, OF HANOVER-KLEEFELD, GERMANY

PROCESS OF PRODUCTION OF ALKALI CARBONATES AND AMMONIA BY SAPONIFICATION OF CALCIUM CYANAMIDE

No Drawing. Application filed July 27, 1926, Serial No. 125,323, and in Germany July 21, 1924.

I have filed application for patent in Germany July 21, 1924, and in Austria July 4, 1925.

Calcium cyanamide has been decomposed hitherto to obtain ammonia, by heating the same under pressure in the presence of water to hydrolize the calcium cyanamide.

This process has been modified by carrying out the reaction in the presence of salts, as calcium chloride and calcium nitrate. It has further been proposed to carry out the reaction in the presence of alkali metal hydroxides or carbonates. These compounds are used in small quantities for their catalyzing effect.

From all these reactions a disagreeable mud is separated, which consists of calcium carbonate or of a mixture of calcium carbonate and lime, and which can be considered as a very onerous technical by-product, the more so as it can only be removed with difficulty.

It has been found that the inconveniences connected with the production of ammonia by saponification of a calcium cyanamide under pressure and the working up of the end products can be avoided by carrying out the saponification of the calcium cyanamide with or in the presence of alkali metal fluorides. In this case the alkali metal fluorides react with the calcium cyanamide into calcium fluoride and cyanamide salts, the calcium fluoride which has been produced being capable of being readily filtered from the solution. The filtrate is subsequently heated, with or without pressure, to separate alkali metal carbonate and ammonia.

$$CaCN_2 + 2NaF = Na_2CN_2 + CaF_2$$

filter out the $CaF_2$ and heat the filtrate to decompose the $Na_2CN_2$:

$$Na_2CN_2 + 3H_2O = Na_2CO_3 + 2NH_3.$$

The process may be conducted so that the calcium cyanamide is reacted upon directly with alkali metal fluoride, the reaction mixture being otherwise treated as the filtrate has been treated.

The calcium fluoride which is also obtained from the reaction, can be continuously used for building up the alkali metal fluorides. The calcium fluoride is, for instance, caused to react with a silicon fluoride and an alkali metal salt in the presence of an acid, whereby alkali metal silico-fluoride is produced, which is heated to decompose it into alkali metal fluoride and silicon fluoride. While the alkali metal fluoride is used for the saponification of the calcium cyanamide, and the silicon fluoride which has been liberated is used for recuperating the alkali metal fluoride or alkali metal silico-fluoride from the calcium fluoride obtained from the process.

$$CaF_2 + SiF_4 + 2NaCl + acid = Na_2SiF_6 + CaCl_2 + acid,$$

$$Na_2SiF_6 + heat = 2NaF + SiF_4$$

2NaF to be used to react with the calcium cyanamide and $SiF_4$ to be used to react with the calcium fluoride and alkali metal chloride to form a fresh quantity of sodium silico-fluoride.

The reproduction of the alkali metal fluoride can be effected by means of other complex alkali metal fluorides.

Instead of silicon fluoride, boron fluoride, titanium fluoride or the fluoride of another element, producing a complex fluoride compound, may be used. The formation of the complex alkali metal fluoride with the aid of calcium fluoride takes place, under heat and pressure. The presence of acid is not necessary, but the reaction is slow. Alkali metal salt, preferably alkali metal chloride, is used.

Instead of using the fluoride of the complex forming element, the operation can be carried through with the oxide of the complex forming element, i. e., for building up the alkali metal silico-fluoride, calcium fluoride may react with silicic acid especially active silicic acid, and an alkali salt in the presence of an acid.

The whole process is explained by the following equations:

1. $CaCN_2 + 2NaF + 3H_2O = Na_2CO_3 + 2NH_3 + CaF_2$

2. $CaF_2 + 2NaCl + SiF_4 + 1/x\ acid = Na_2SiF_6 + CaCl_2 + 1/x\ acid$

3. $Na_2SiF_6 + heat = 2NaF + SiF_4$.

The calcium chloride separated during the reaction may be converted by known methods with ammonia and carbon dioxide into ammonium chloride and calcium carbonate. The calcium carbonate obtained, which is distinguished by special purity, can be re-introduced into the process for the production of calcium cyanamide.

*Example*

Calcium cyanamide, containing 80 kilos $CaCN_2$, and 84 kilos of sodium fluoride are dissolved in 300 liters of water and thoroughly stirred for 1 hour and allowed to settle. The solution of sodium cyanamide is separated from the precipitate. The solution containing the sodium cyanamide is placed in a closed container and heated until decomposed, the resulting ammonia being led off to a suitable container while the remaining solution of $Na_2CO_3$ is evaporated for recovery of the carbonate as a solid.

78 kilos of the $CaF_2$ is treated with 104 kilos of $SiF_4$ and 120 kilos of NaCl of 97% in 350 liters of water, adding thereto 20 kilos HCl of 30%. The mixture is stirred until the $Na_2SiF_6$ precipitates, which is then separated. The precipitate is heated until it is decomposed, and the $SiF_4$ is led off and used for the producing $Na_2SiF_6$. The resulting NaF is added to a fresh quantity of cyanamide.

To the $CaCl_2$ solution is added the ammonia (obtained by the saponification of calcium cyanamide) and $CO_2$ gas, the carbonate being precipitated. This is separated and utilized for the production of cyanamide.

$CaCl_2 + 2NH_3 + CO_2 + H_2O = CaCO_3 + 2NH_4Cl$

As during the production of the calcium cyanamide a molecule of carbon is liberated, the carbon dioxide required for carrying out the process may be produced by heating calcium fluoride and carbon, so that the carbon burns to dioxide.

I claim—

1. A process of production of alkali metal carbonates and ammonia by saponification of calcium cyanamide, comprising carrying out this reaction in the presence of such quantities of an alkali metal fluoride, that all of the calcium is converted into calcium fluoride, and heating the alkali metal cyanamide solution, so that ammonia is given off.

2. A process of production of alkali metal carbonate and ammonia by saponification of calcium cyanamide, comprising first forming alkali metal cyanamide by reacting on a calcium cyanamide solution with alkali metal fluoride separating the alkali metal cyanamide from the calcium fluoride, and heating the alkali metal cyanamide solution to form ammonia and alkali metal carbonate.

3. Process of producing alkali-metal carbonate and ammonia by saponification of calcium cyanamide, which comprises carrying out the saponification with an alkali-metal fluoride in solution, separating the resultant solution and heating it to liberate ammonia and form alkali metal carbonate, and reacting on the calcium fluoride resulting from the saponifying step, with an alkali metal salt and a fluoride capable of forming a complex alkali metal fluoride in the presence of an acid, decomposing the complex fluoride by heat to alkali metal fluoride for treating a fresh quantity of calcium cyanamide and the fluoride which forms the complex fluoride, for return into the cycle of operations in treating the resulting calcium fluoride.

4. Process of producing alkali-metal carbonate and ammonium by saponification in solution of calcium cyanamide, which comprises carrying out the saponification with an alkali metal fluoride separating the resulting solution, heating it to separate ammonia and form alkali metal carbonate, forming a complex fluoride obtained by saponification by reacting on the calcium fluoride with an alkali metal salt and a compound containing an element capable of forming a complex alkali-metal fluoride in the presence of an acid, decomposing the complex fluoride by heat to alkali metal fluoride for treating a fresh quantity of calcium cyanamide and the fluoride which forms the complex fluoride, for return into the cycle of operations to react on calcium fluoride.

5. Process of producing alkali metal carbonate and ammonia by saponification in solution of calcium cyanamide, comprising reacting on the cyanamide with an alkali metal fluoride, separating the resulting calcium fluoride and solution, heating the latter to liberate ammonia and form alkali metal carbonate, reacting thereon on the calcium fluoride with an alkali metal chloride and a fluoride complex forming element to form complex alkali metal fluoride and calcium chloride, and converting the latter in the presence of water together with ammonia resulting from the saponification of the cyanamide and carbon dioxide into calcium carbonate and ammonium chloride.

6. Process of producing alkali metal carbonate and ammonia by saponification in solution of calcium cyanamide, comprising reacting on the cyanamide with an alkali metal fluoride, separating the resulting calcium fluoride and solution, heating the latter to separate ammonia and form alkali metal carbonate, reacting on the calcium fluoride with an alkali metal chloride and a compound containing an element capable of forming a complex alkali metal fluoride and calcium chloride, and converting the latter in the presence of water and ammonia resulting from the saponification of the cyanamide and carbon dioxide into calcium carbonate and ammonium chloride.

7. A process of producing alkali metal-carbonate and ammonia by saponifying in solution calcium-cyanamide in the presence of alkali-metal-fluoride, separating the solution, heating it to liberate ammonia and form alkali metal carbonate, repreparing the alkali-metal-fluoride from the calcium-fluoride resulting from saponifying, while the calcium fluoride is converted into calcium-chloride, treating the calcium chloride with ammonia in presence of water and carbon-dioxide to produce calcium carbonate and ammonium-chloride and producing the carbon dioxide necessary for the last step, from the carbon in the calcium-cyanamide and liberated during the production of calcium-cyanamide from calcium-carbide.

In testimony that I claim the foregoing as my invention, I have signed my name.

Dr. MAX BUCHNER.